W. SCULLY.

Assignor to the DETROIT IRON AND BRASS MANUFACTURING COMPANY.

Machine for Grinding and Polishing Hollow Ware.

No. 7,963. Reissued Nov. 27, 1877.

Witnesses:
[illegible]
[illegible]

Inventor
Wm. Scully
By Atty
[illegible]

UNITED STATES PATENT OFFICE.

WILLIAM SCULLY, OF DETROIT, MICHIGAN, ASSIGNOR TO THE DETROIT IRON AND BRASS MANUFACTURING COMPANY.

IMPROVEMENT IN MACHINES FOR GRINDING AND POLISHING HOLLOW WARE.

Specification forming part of Letters Patent No. 189,505, dated April 10, 1877; Reissue No. 7,963, dated November 27, 1877; application filed November 6, 1877.

*To all whom it may concern:*

Be it known that I, WILLIAM SCULLY, of Detroit, in the county of Wayne and State of Michigan, have invented an Improvement in Machines for Grinding and Polishing Hollow Ware, of which the following is a specification:

The object of my invention is to provide a machine by means of which the inner surfaces of hollow ware may be more rapidly ground and polished than heretofore; and it consists in the peculiar construction, arrangement, and combination of the various parts, as more fully hereinafter set forth, shown, and described.

Figure 1:
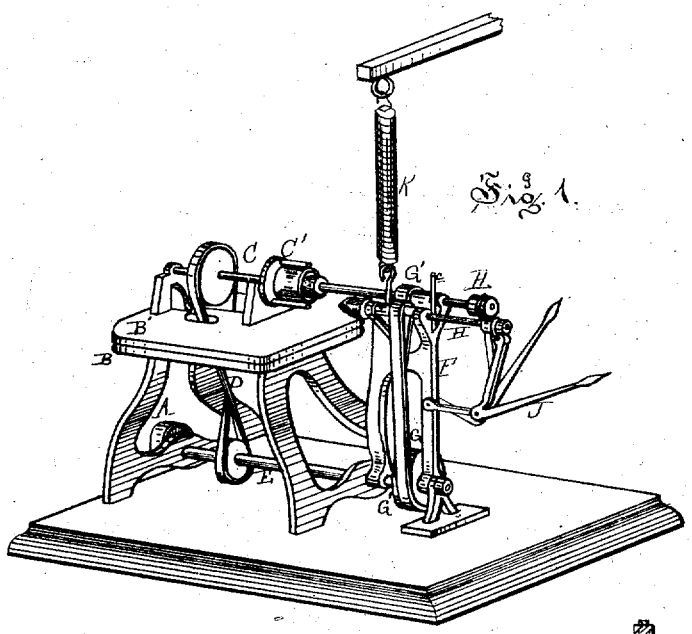
Figure 2:
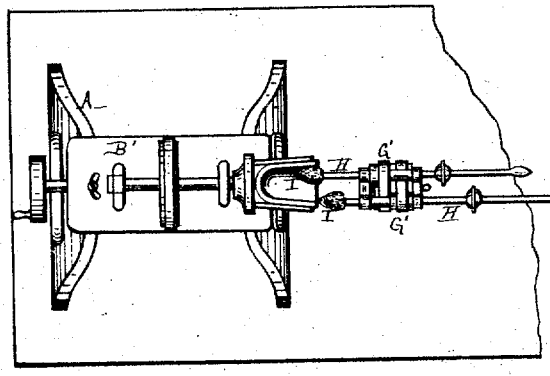
Figure 3:
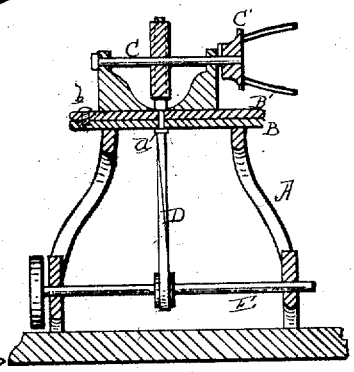

In the drawings, Figure 1 is a perspective view of my improved machine, showing a swinging frame carrying a gang of rapidly-rotating spindles, each carrying at its inner end an emery or other grinding wheel of peculiar construction, so arranged that the wheels may be successively brought into contact with the interior surface of the vessel or article, which is also rotated by a belt from the same shaft which gives motion to the spindles, with a chuck-spindle susceptible of an eccentric adjustment, or to "set over" out of the axis of rotation of the grinding-spindles, thereby avoiding abrasive action of the wheels in parallel circumferential lines, bringing fresh abrasive surfaces to bear upon the work, and producing a better polish on the surface of the work. Fig. 2 is a sectional plan view, in which the emery-wheels are shown as attached to and covering the ends of their carrying-spindles. Fig. 3 is a longitudinal vertical section of the chuck-table.

A represents the main-table frame, supporting a table, B, on which a chuck table or stock, B′, is pivoted at *a*, to permit of an angular adjustment in which it may be secured by a set-screw, *b*, tapped into the bed or table B, through a slot. C is the tail-spindle, journaled in the stock B′, and is driven by a crossed belt, D, from a pulley on the main shaft E, journaled through the lower part of the frame, giving said tail-spindle a comparatively slow motion. The spindle C carries a chuck, C′, in which the pot or other article to be ground is secured. F is a swinging frame, whose lower ends are sleeved on the projecting end of the driving-shaft, on which is a drum, G, between the legs of said frame, the head of which is T-shaped at each end, so as to permit of two parallel spindles, H H, being journaled therein, each carrying at the front end a pear-shaped emery-wheel, I, which incloses the end of its spindle. These spindles are susceptible of a longitudinal movement in their bearings, by means of a bell-crank lever, J, at the back end. A pulley, G, is feathered on each spindle H, between the bearings of the latter, which is driven at a high rate of speed by a belt, $G^2$, from the drum G, both spindles being driven in the same direction. The frame F is normally kept in a vertical position by a spiral spring, J′, or an equivalent cord and counter-weight, which will allow it to be swung laterally, it being provided with a handle, *c*, for that purpose.

One of the emery-wheels is coarse in grain, so as to rapidly cut away the skin of the metal, while the other is fine, so as to produce a polish on its roughly-ground inner surface.

A vessel being secured in the chuck, and in motion, to grind it the operator takes the handle *c* in one hand, and swings the frame F so as to bring the spindle carrying the coarser wheel opposite the vessel. With the other hand on the bell-crank he projects the spindle into the vessel, keeping the outer edge and end of the coarser wheel in contact with the interior surface of said vessel until it is roughly ground. Then, withdrawing the coarse wheel, he swings over the frame, and in like manner introduces the finer wheel, with which he completes the grinding and polishing of the surface of the vessel or other article.

In polishing skillets, spiders, and other flat-bottomed vessels, the tail-stock may be set over a little, so as not to have the article revolve in an axis parallel with that of the grinding-spindles, whereby all chance of grinding the surface in concentric and parallel lines is avoided, thereby producing a much finer polish, while the abrasive surface of the wheels is constantly changed, so that the grinding and polishing process is much more rapid.

What I claim as my invention, and desire to secure by Letters Patent, is—

1. The combination of a chuck adapted to receive an article of hollow ware with an adjustable frame carrying one or more rotating spindles, and having an emery-wheel projecting beyond and covering or partially covering the ends of the spindles, substantially as and for the purposes set forth.

2. The combination of a chuck adapted to receive an article of hollow ware with a frame carrying one or more rotating spindles susceptible of longitudinal adjustment, and having an emery-wheel projecting beyond and covering or partially covering the end of the spindle or spindles, substantially as and for the purposes set forth.

3. The combination, with a rotary tail spindle and chuck adapted to receive and secure an article of hollow ware, of a swinging frame and a gang of grinding-wheel spindles susceptible of longitudinal adjustment in their bearings, all of which spindles are driven from the same shaft, substantially as described.

4. In a grinding-machine, substantially as described, the swinging adjustable frame carrying a gang of spindles, all driven by belts on the main shaft, and susceptible of independent longitudinal adjustment to and from the surface of the work, substantially as set forth.

WILLIAM SCULLY.

Witnesses:
H. S. SPRAGUE,
CHAS. THURMAN.